(12) United States Patent
Okazaki et al.

(10) Patent No.: US 10,488,853 B2
(45) Date of Patent: Nov. 26, 2019

(54) OFFLINE TEACHING DEVICE

(71) Applicant: Panasonic Intellectual Property Management Co., Ltd., Osaka (JP)

(72) Inventors: Yoshiyuki Okazaki, Shiga (JP); Masaya Hirayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 259 days.

(21) Appl. No.: 15/543,572

(22) PCT Filed: Feb. 18, 2016

(86) PCT No.: PCT/JP2016/000857
§ 371 (c)(1),
(2) Date: Jul. 13, 2017

(87) PCT Pub. No.: WO2016/136209
PCT Pub. Date: Sep. 1, 2016

(65) Prior Publication Data
US 2017/0371326 A1 Dec. 28, 2017

(30) Foreign Application Priority Data
Feb. 23, 2015 (JP) .................. 2015-032417

(51) Int. Cl.
*G05B 19/421* (2006.01)
*B23K 9/095* (2006.01)
(52) U.S. Cl.
CPC .......... *G05B 19/421* (2013.01); *B23K 9/0953* (2013.01); *G05B 2219/40107* (2013.01); *G05B 2219/45104* (2013.01)
(58) Field of Classification Search
None
See application file for complete search history.

(56) References Cited

U.S. PATENT DOCUMENTS 5,963,451 A * 10/1999 Seki .................. G05B 19/4097
700/182
6,167,328 A 12/2000 Takaoka et al.
2005/0049749 A1 * 3/2005 Watanabe .............. B25J 9/1671
700/245

FOREIGN PATENT DOCUMENTS

JP 6-214625 8/1994

OTHER PUBLICATIONS

International Search Report of PCT application No. PCT/JP2016/000857 dated May 10, 2016.
(Continued)

*Primary Examiner* — Sean Shechtman
(74) *Attorney, Agent, or Firm* — Wenderoth, Lind & Ponack, L.L.P.

(57) ABSTRACT

In an offline teaching device in the related art, in the case of changing a teaching program, even in the case of performing the same change at each teaching point, it is necessary to perform the change with respect to each teaching point. The offline teaching device of the present disclosure has a selection function, a first change function, a second change function, a welding line storage function, and a teaching program storage function. The selection function causes one welding line among a plurality of welding lines stored in the welding line storage function to be selected. The first change function causes content of a welding conditions configuring the welding line selected with the selection function to be changed. The second change function causes the welding conditions of entire instructions in the teaching program having the same welding line identification information as welding line identification information that is assigned to the welding line selected with the selection function to be changed to the same content as content changed with the first change function.

3 Claims, 8 Drawing Sheets

(56) References Cited

OTHER PUBLICATIONS

Extended European Search Report dated Feb. 26, 2018 in European Application No. 16754960.9.

* cited by examiner

FIG. 4

WELDING LINE [3]

| No. | X | Y | Z |
|---|---|---|---|
| 1 | 10.00 | 20.00 | 30.00 |
| 2 | 10.00 | 30.00 | 30.00 |
| 3 | 10.00 | 40.00 | 30.00 |
| 4 | 10.00 | 50.00 | 30.00 |
| 5 | 10.00 | 60.00 | 30.00 |

104

105 — WELDING CONDITION: 5: HORIZONTAL FILLET LEG LENGTH 8 mm ▼

[ OK ]  [ CANCEL ]

FIG. 5

WELDING CONDITION [5]

COMMENT: HORIZONTAL FILLET LEG LENGTH 8 mm

START AND INTERMEDIATE
- CURRENT: 230
- VOLTAGE: 20
- SPEED: 0.15

END
- CURRENT: 200
- VOLTAGE: 18
- TIME: 2.0

TORCH TARGET POSITION AND ORIENTATION
- dx: 0.00
- dy: 0.00
- dz: 0.00
- ORIENTATION U: 0.0
- ORIENTATION V: 45.0
- ORIENTATION W: 130.0

[ OK ]  [ CANCEL ]

FIG. 6

| WELDING CONDITION [5] | | |
|---|---|---|
| COMMENT | HORIZONTAL FILLET   LEG LENGTH   8 mm | |

| START AND INTERMEDIATE | END | TORCH TARGET POSITION AND ORIENTATION |
|---|---|---|
| CURRENT 230 | CURRENT 200 | dx 0.00 |
| VOLTAGE 20 | VOLTAGE 18 | dy 0.00 |
| SPEED 0.15 | TIME 2.0 | dz 0.00 |
| | | ORIENTATION U 0.0 |
| | | ORIENTATION V 60.0 |
| | | ORIENTATION W 130.0 |

[ OK ]   [ CANCEL ]

FIG. 7

| WELDING CONDITION [5] | | |
|---|---|---|
| COMMENT | HORIZONTAL FILLET   LEG LENGTH   8 mm | |
| START AND INTERMEDIATE | END | TORCH TARGET POSITION AND ORIENTATION |
| CURRENT 230<br>VOLTAGE 20<br>SPEED 0.15 | CURRENT 200<br>VOLTAGE 18<br>TIME 2.0 | dx 0.00<br>dy 0.20<br>dz 0.00<br>ORIENTATION U 0.0<br>ORIENTATION V 60.0<br>ORIENTATION W 130.0 |

OK   CANCEL

FIG. 8

| WELDING CONDITION [5] | | |
|---|---|---|
| COMMENT | HORIZONTAL FILLET   LEG LENGTH   8 mm | |

| START AND INTERMEDIATE | END | TORCH TARGET POSITION AND ORIENTATION |
|---|---|---|
| CURRENT 220 | CURRENT 200 | dx 0.00 |
| VOLTAGE 20 | VOLTAGE 18 | dy 0.20 |
| SPEED 0.15 | TIME 2.0 | dz 0.00 |
| | | ORIENTATION U 0.0 |
| | | ORIENTATION V 60.0 |
| | | ORIENTATION W 130.0 |

OK    CANCEL

FIG. 9

| WELDING CONDITION [5] | | |
|---|---|---|
| COMMENT | HORIZONTAL FILLET   LEG LENGTH   8 mm | |

| START AND INTERMEDIATE | END | TORCH TARGET POSITION AND ORIENTATION |
|---|---|---|
| CURRENT 220 | CURRENT 200 | dx   0.00 |
| VOLTAGE 20 | VOLTAGE 18 | dy   0.20 |
| SPEED 0.15 | TIME 2.0 | dz   0.00 |
| | | ORIENTATION U |
| | | 0.0 |
| | | ORIENTATION V |
| | | 60.0 |
| | | ORIENTATION W |
| | | 130.0 |

OK   CANCEL

OFFLINE TEACHING DEVICE

TECHNICAL FIELD

The present disclosure relates to an offline teaching device for performing creation, edit, or the like of a teaching program for operating a welding system including, for example, a welding device and a robot.

BACKGROUND ART

In the teaching program of the welding system for performing welding by the robot, in general, a torch target position and a torch orientation are registered as an operation instruction. In addition, welding parameters such as a welding current and a welding voltage are registered as a welding instruction. Since the operation instruction relates to the torch target position and torch orientation, the operation instruction is controlled by the robot. Since the welding instruction relates to the welding parameters such as the welding current and the welding voltage, the welding instruction is controlled by a welding device. Thus, the operation instruction and the welding instruction are instructions of different natures, and not registered in the same line in the teaching program. That is, the operation instruction and the welding instruction are registered in lines different and away from each other in the teaching program of the welding system. The torch target position, the torch orientation, and the welding parameters (welding current, welding voltage, or the like) are collectively referred to as a welding condition.

A technology which relates to the offline teaching device for automatically teaching the teaching program of such a welding system, and creates the teaching program under a condition where a robot operation pattern and a database of the welding parameters are prepared is known (see PTL 1).

CITATION LIST

Patent Literature

PTL 1: Japanese Patent Unexamined Publication No. 6-214625

SUMMARY OF THE INVENTION

It is known that a torch target position that is a target position of a torch tip end, a torch orientation that is an angle of the torch with respect to a welding object, and welding parameters such as a welding current are closely associated with each other to affect a welding result (finish) of arc welding. Therefore, when changing any condition of these welding conditions (torch target position, torch orientation, and welding parameters), it is necessary to change settings with respect to conditions other than the changed condition as well. However, in a teaching program, an operation instruction including the torch target position and the torch orientation and a welding instruction including the welding parameters to be changed while necessarily being associated with each other, are separately registered on separate lines. Thus, for example, after welding, in order to improve the welding result (finish), in a case where one of the operation instruction and the welding instruction is changed and the other of the instructions which has to be changed in association with the one is not changed, there is a possibility that the welding result may be deteriorated conversely.

In addition, in general, a welding start point, a welding end point, and a plurality of intermediate points located therebetween, exist, as coordinate positions, on a welding line. For example, in a case of performing fillet welding of a straight line, the torch target position and the torch orientation are the same in coordinate positions of the welding start point, and the welding end point, and the plurality of intermediate points between the welding start point and the welding end point. In addition, the torch target position, the torch orientation, and the welding parameters are the same on the plurality of intermediate points. Therefore, after performing the welding under a certain welding condition, for example, in a case where the torch orientation is changed in order to improve the welding result, it is necessary to change the torch orientations in the same manner over the entirety of the welding start point, the welding end point, and the plurality of intermediate points. Further, as described above, in accordance with the change of the torch orientation (in other words, change of operation instruction), over the entirety of the welding start point, the welding end point, and the plurality of intermediate points, it is necessary to change the torch target position and the welding instruction one by one. In this manner, there was a problem that the offline teaching device in the related art requires much labor to change the teaching program.

In order to solve the problem, the offline teaching device of the present disclosure includes a control unit, a welding line storage unit, and a teaching program storage unit. The control unit has a selection function, a first change function, and a second change function. The welding line storage unit is connected to the control unit, and has a welding line storage function. The teaching program storage unit is connected to the control unit, and has a teaching program storage function. The welding line storage function stores a plurality of welding lines which have a plurality of coordinate positions in a welding path and a welding condition that is information relating to the welding in each of coordinate positions, and to which welding line identification information is assigned. The teaching program storage function stores a teaching program having a plurality of instructions, to which welding line identification information is assigned, and having the welding condition. The selection function causes one welding line among the plurality of welding lines stored in the welding line storage function to be selected. The first change function causes content of the welding condition configuring the welding line selected with the selection function to be changed. The second change function causes the welding conditions of entire instructions in the teaching program having the same welding line identification information as the welding line identification information that is assigned to the welding line selected with the selection function to be changed to the same content as the content changed with the first change function.

As described above, according to the present disclosure, it is not necessary for an operator to change the welding conditions of a plurality of coordinate positions in the teaching program for each teaching point one by one, and by changing the welding condition stored in the welding line storage unit, it is possible to change the welding conditions of the plurality of coordinate positions in the teaching program at a time, and it is possible for the operator to reduce burden on a changing operation.

BRIEF DESCRIPTION OF DRAWINGS

FIG. 4 is a diagram showing a display example of information of welding line 103 in the embodiment.

FIG. 5 is a diagram showing a display example of information of welding condition 105 in the embodiment.

FIG. 6 is a diagram showing a display example of information of welding condition 105 in the embodiment.

FIG. 7 is a diagram showing a display example of information of welding condition 105 in the embodiment.

FIG. 8 is a diagram showing a display example of information of welding condition 105 in the embodiment.

FIG. 9 is a diagram showing a display example of information of welding condition 105 in the embodiment.

DESCRIPTION OF EMBODIMENT

Hereinafter, an embodiment of the present disclosure will be described by using FIG. 1 to FIG. 9.

Embodiment 1

Figure 1:
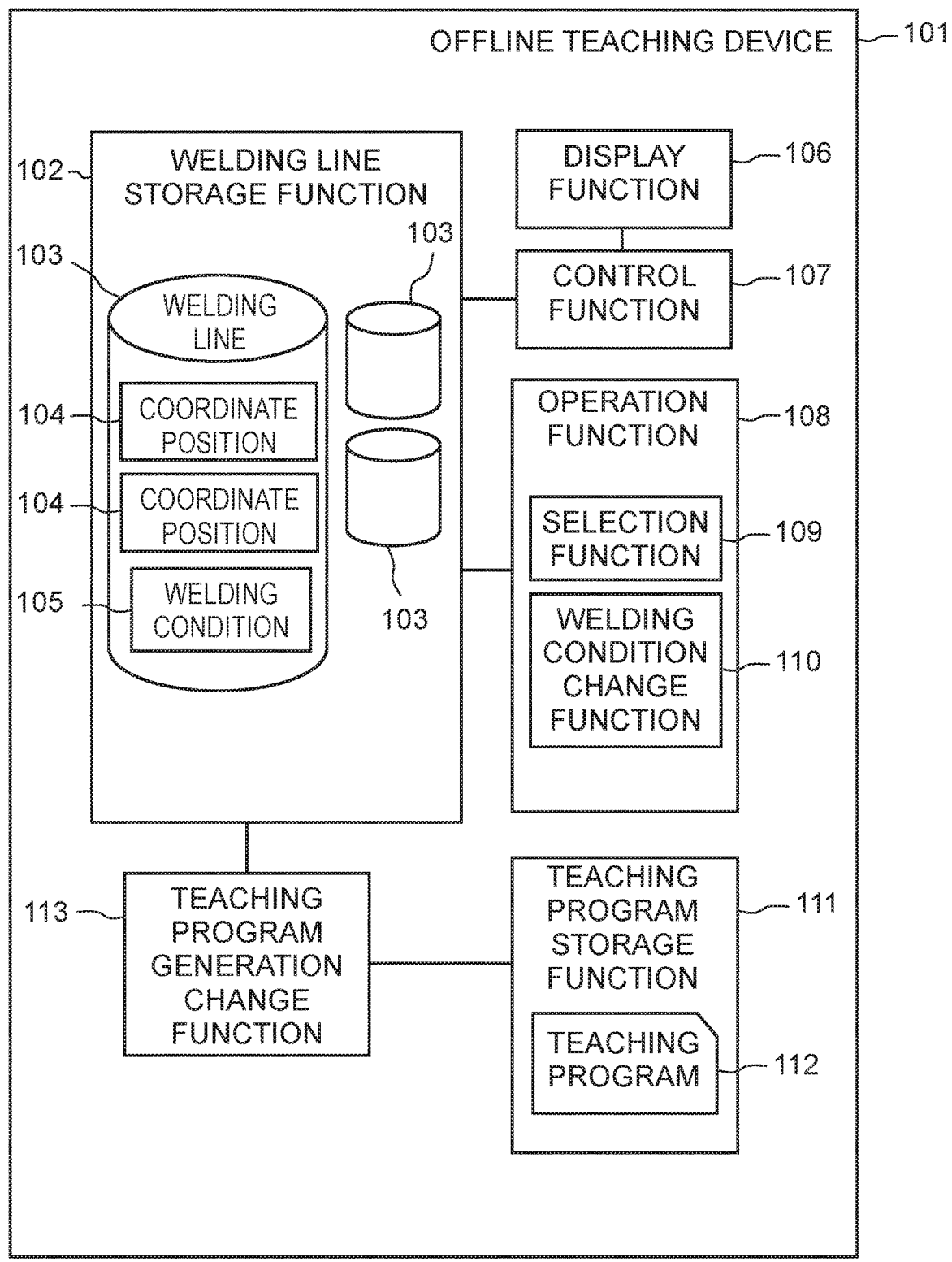
FIG. 1 is a correlation diagram of a function of offline teaching device 101.

FIG. 1 is a correlation diagram of a function of offline teaching device 101. In FIG. 1, offline teaching device 101 has welding line storage function 102, display function 106, control function 107, operation function 108, teaching program generation and change function 113 (second change function), and teaching program storage function 111.

Welding line storage function 102 stores a plurality of welding lines 103. Welding line 103 has a plurality of coordinate positions 104 and one welding condition 105. In FIG. 1, a case where three welding lines 103 are included in welding line storage function 102 is shown as an example, and a case where two coordinate positions 104 and one welding condition 105 are included in one welding line 103 is shown as an example.

One or more welding conditions 105 exist in welding line storage function 102, and welding condition identification information is assigned to each welding condition 105. The welding condition identification information is stored in welding condition 105.

Welding condition 105 with the welding condition identification information is provided for each of the plurality of coordinate positions 104. There is a case where welding condition 105 is provided in common at two or more coordinate positions 104, and there is a case where different welding condition 105 is provided for each coordinate position 104. Common welding condition 105 has the same welding condition identification information.

Welding line 103 is configured by one or more coordinate positions 104 in a welding path, and one welding condition 105 that is information relating to welding. Coordinate position 104 represents position information of welding line 103. Welding condition 105 has welding parameters such as a welding current at the time of welding, and further has a torch target position and a torch orientation. Only one welding condition 105 is set for one welding line 103. In addition, welding line identification information is assigned to each of the plurality of welding lines 103. The torch target position represents three-dimensional coordinates representing a three-dimensional relative position of a welding torch tip end with respect to a coordinate position (position to be processed), and in other words, a three-dimensional offset amount with respect to the coordinate position. The torch orientation is a three-dimensional vector representing a direction of the welding torch tip end. A teaching point is obtained by adding the torch target position to the coordinate position, and in a case where the torch target position is 0 (offset with respect to coordinate position is 0), the coordinate position becomes the teaching point. Each of the torch target position and the torch orientation has three parameters. With this, a state (position and direction) of welding torch and the teaching point with respect to the coordinate position are identified.

Control function 107 causes information relating to welding line 103 on display function 106 to be displayed, based on content stored in welding line storage function 102 and an instruction from operation function 108. For example, the information displayed on display function 106 is a three-dimensional model of the welding object, a welding line on the three-dimensional model, a welding condition, or the like.

Operation function 108 is a function operated by an operation of an operator, and has selection function 109, and welding condition change function 110 (first change function). For example, selection function 109 is operated in a case where the operator selects welding line 103 or the like displayed with display function 106. For example, welding condition change function 110 is operated in a case where the operator changes content of welding condition 105 configuring welding line 103.

Teaching program generation and change function 113 causes creation and change of teaching program 112 to be performed. Teaching program generation and change function 113 causes teaching program 112 to be generated based on coordinate position 104 and welding condition 105 input and selected by operating operation function 108 by the operator, and causes the generated teaching program 112 to be stored in teaching program storage function 111, when a new teaching program 112 is created. By repeating this, it is also possible to create the teaching program relating to the plurality of welding lines 103. In addition, as described below, teaching program generation and change function 113 causes content of teaching program 112 to be changed based on content of welding condition 105 changed with welding condition change function 110, in a case where content of teaching program 112 stored in teaching program storage function 111 is changed.

Teaching program storage function 111 stores teaching program 112. Teaching program 112 has a plurality of operation instructions of a robot and a plurality of welding instructions of a welding device. The welding line identification information assigned to welding line 103 is assigned to each operation instruction and each welding instruction. Teaching program 112 for performing arc welding has the torch target position and the torch orientation as content of the operation instruction, and has the welding parameters such as the welding current as content of the welding instruction. A tip end of a consumable electrode is a point which coincides with the teaching point at the time of welding in the torch for the consumable electrode, and a tip end of a non-consumable electrode is a point which coincides with the teaching point at the time of welding in the torch for the non-consumable electrode.

Figure 2:
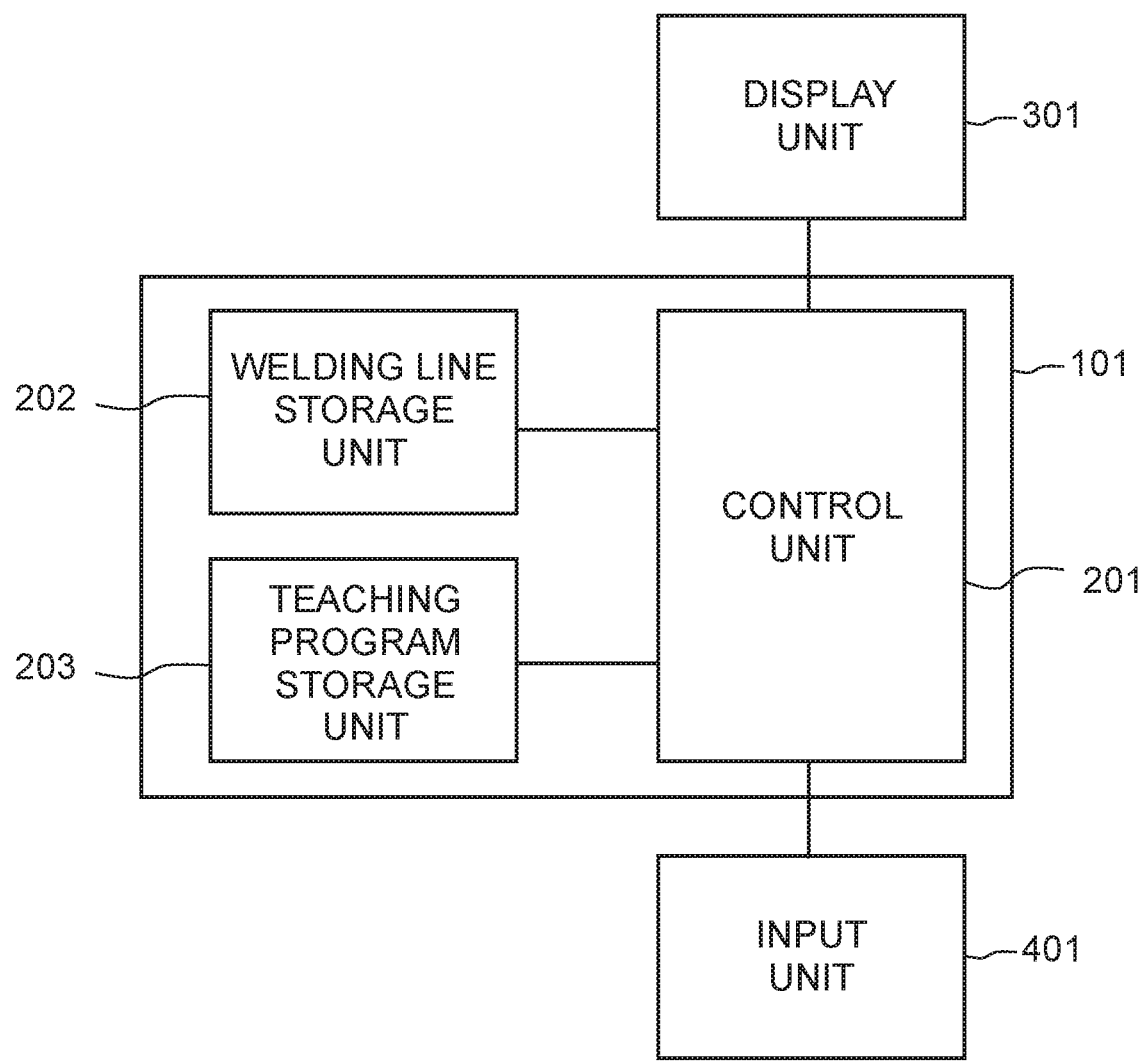
FIG. 2 is a schematic configuration diagram of offline teaching device 101.

Next, a configuration of offline teaching device 101 will be described by using FIG. 2. FIG. 2 is a schematic configuration diagram of offline teaching device 101.

As described in FIG. 2, offline teaching device 101 includes control unit 201, welding line storage unit 202, and teaching program storage unit 203. In addition, offline teaching device 101 is connected to display unit 301 and input unit 401, receives an input signal from input unit 401, and outputs an output signal to display unit 301.

For example, offline teaching device 101 is a personal computer (PC), control unit 201 is an arithmetic device such as a central processing unit (CPU), and welding line storage unit 202 and teaching program storage unit 203 are memories such as a dynamic random access memory (DRAM) and a hard disc drive (HDD). Welding line storage unit 202 and teaching program storage unit 203 may be different memories, and may be different regions in one memory. Display unit 301 is, for example, a display, and input unit 401 is, for example, a keyboard or a mouse.

Control unit 201 has display function 106, control function 107, operation function 108 having selection function 109 and welding condition change function 110, and teaching program generation and change function 113, described by using FIG. 1. Welding line storage unit 202 has welding line storage function 102, and teaching program storage unit 203 has teaching program storage function 111. The input signal from input unit 401 is processed with operation function 108 of control unit 201, and display of display unit 301 is controlled with display function 106 of control unit 201. In addition, control unit 201 can read and write information stored in welding line storage unit 202 or teaching program storage unit 203. Each operation of control unit 201, welding line storage unit 202, and teaching program storage unit 203 is the same those described by using FIG. 1.

Figure 3:
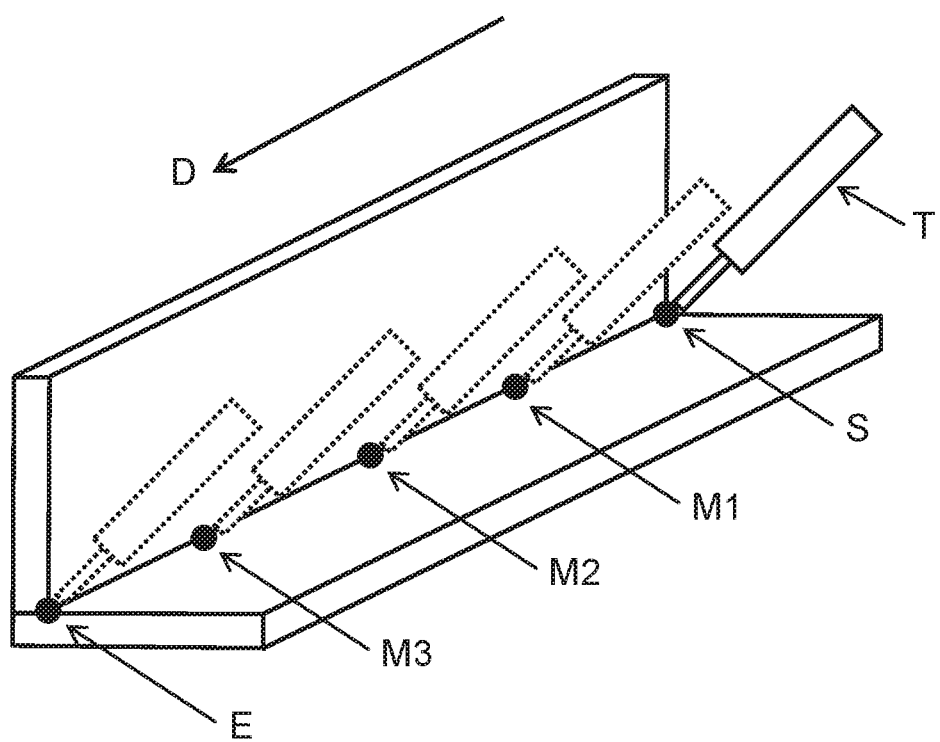
FIG. 3 is a perspective view for explaining a welding work in an embodiment.

Next, by using FIG. 3 to FIG. 9, operations of an offline teaching device of the embodiment will be described by using a specific example. FIG. 3 is a perspective view for explaining a welding work in the embodiment. FIG. 4 is a diagram showing a display example of information of welding line 103 in the embodiment. FIG. 5 to FIG. 9 are diagrams showing a display example of information of welding condition 105 in the embodiment. In the embodiment, teaching program 112 for performing fillet welding of a straight line will be described by using a welding system including an arc welding device and a robot.

As described in FIG. 3, the fillet welding with welding start point S, welding end point E, and the plurality of intermediate points positioned between welding start point S and welding end point E, as coordinate positions in the welding path, will be described. In the fillet welding shown in FIG. 3, a straight line connecting these coordinate positions is the welding line. The plurality of intermediate points become three intermediate points such as first intermediate point M1, second intermediate point M2, and third intermediate point M3. That is, there are five teaching points on the welding line. In the embodiment, welding torch T performs fillet welding which welds each coordinate position in a direction of welding direction D.

Teaching program 112 has first operation instruction A1 and first welding instruction W1 corresponding to welding start point S, second operation instruction A2 and second welding instruction W2 corresponding to first intermediate point M1, third operation instruction A3 and third welding instruction W3 corresponding to second intermediate point M2, fourth operation instruction A4 and fourth welding instruction W4 corresponding to third intermediate point M3, and fifth operation instruction A5 and fifth welding instruction W5 corresponding to welding end point E.

In the fillet welding of which welding line is a straight line, instructions from first operation instruction A1 to fifth operation instruction A5 are the same, and instructions from second welding instruction W2 to fourth welding instruction W4 are the same. With respect to the welding instruction, there is a case where instructions from first welding instruction W1 to fourth welding instruction W4 are the same. In the embodiment, the case will be described. In addition, the same welding line identification information is assigned to ten instructions from first operation instruction A1 to fifth operation instruction A5, and from first welding instruction W1 to fifth welding instruction W5. In other words, the ten instructions are grouped as welding conditions of welding line to which one welding line identification information is assigned. The welding line identification information is also assigned to welding line 103 having welding condition 105 stored in welding line storage function 102. Welding condition 105 configuring welding line 103 to which the welding line identification information is assigned has a combination of the torch target position, the torch orientation, and the welding parameters (welding current, welding voltage, or the like). The welding condition identification information for identifying welding conditions 105 is also assigned to welding condition 105. In FIG. 4, which will be described, an example in which the welding line identification information of welding line 103 is "3" is shown, and in FIG. 4 to FIG. 9, examples in which a welding condition that the welding condition identification information of welding condition 105 is "5" is selected are shown. The welding line to which the welding line identification information "3" is assigned includes welding start point S, intermediate point M1 to intermediate point M3, and welding end point E in FIG. 3 as the coordinate positions.

Here, after performing welding based on welding condition 105 to which the welding condition identification information "5" is assigned, and which configures welding line 103 to which the welding line identification information "3" is assigned, in order to improve a welding result, a case where the torch orientation (particularly, orientation U) included in welding condition 105 is changed is considered.

As described in FIG. 4, with respect to welding line 103 to which the welding line identification information "3" is assigned, five coordinate positions and one welding condition are displayed as a window. The five coordinate positions represent that the welding direction of FIG. 3 is a Y axis direction and the welding line is a straight line because X coordinates and Z coordinates are the same and only Y coordinates are different. That is, the coordinate position to be "No. 1" is welding start point S, the coordinate position to be "No. 2" is intermediate point M1, the coordinate position to be "No. 3" is intermediate point M2, the coordinate position to be "No. 4" is intermediate point M3, and the coordinate position to be "No. 5" is welding end point E. In addition, welding condition 105 is represented by a title of "5: horizontal fillet leg length 8 mm", and a welding condition in which "5" is assigned as the welding condition identification information and which is named as the "horizontal fillet leg length 8 mm" is used as a comment is displayed.

As described in FIG. 5, with respect to welding condition 105 to which the welding condition identification information "5" is assigned, a comment, the welding parameters (current, voltage, and speed) at the start and the intermediate, the welding parameters (current, voltage, and time) at the end, and parameters (dx, dy, dz, orientation U, orientation V, and orientation W) of the target position and orientation are displayed. The "start" means welding start point S, the "intermediate" means intermediate points M1 to M3, the welding parameters of the "start" and the "intermediate" are common, and welding end point E which means the "end"

is a different parameter therefrom. The target position and the orientation are common in entire five coordinate positions.

The operator changes the torch orientation from a first torch orientation to a second torch orientation first in welding condition 105 configuring welding line 103, by using selection function 109 and welding condition change function 110 configuring operation function 108 in order to change stored content of welding line storage function 102. In the embodiment, among orientation U=0.0, orientation V=45.0, and orientation W=130.0, only orientation V is changed to 60.0. FIG. 6 illustrates a window showing a welding condition of the welding condition identification number "5" at the time of changing the first torch orientation to the second torch orientation.

Further, the operator changes the torch target position from a first torch target position to a second torch target position corresponding to the second torch orientation by using operation function 108. In the embodiment, among dx=0.00, dy=0.00, and dz=0.00, only dy is changed to 0.20. FIG. 7 illustrates a window showing the welding condition of the welding condition identification number "5" at the time of changing the first torch target position to the second torch target position.

Further, the operator changes the welding parameters from a first welding parameters to a second welding parameters corresponding to the second torch orientation. In the embodiment, only the welding current is changed from 230 to 220 at the start and intermediate. FIG. 8 illustrates a window showing the welding condition of the welding condition identification number "5" at the time of changing the first welding parameters to the second welding parameters. The welding parameters is the welding current, the welding voltage, or the like. In addition, the operator operates these operations by operating input unit 401 shown in FIG. 2, and thereby operates operation function 108.

As described above, the torch target position, torch orientation, and the welding parameters included in welding condition 105 (welding condition identification information "5") of welding line 103 to which the welding line identification information "3" stored in welding line storage function 102 is assigned are changed. With this, over the entirety of five operation instructions from first operation instruction A1 to fifth operation instruction A5 which relate to teaching program 112 stored in teaching program storage function 111 and the welding line identification information "3" is assigned thereto, the torch target position is changed to the second torch target position, and the torch orientation is changed to the second torch orientation. In addition, in first welding instruction W1 to fourth welding instruction W4 to which first welding line identification information "3" is assigned, the welding parameters are changed to the second welding parameters. That is, by changing content of one welding condition 105 (welding condition identification information "5") stored in welding line storage function 102, it is possible to change each welding condition of five coordinate positions (welding start point S, intermediate point M1 to intermediate point M3, and welding end point E) at once in teaching program 112 stored in teaching program storage function 111. In welding end point E, operation instruction A5 is changed, but welding instruction W5 is not changed because welding instruction W5 is no need to be changed.

As described above, it is possible to reduce burden on a work of changing a welding condition of each coordinate position configuring teaching program 112. The change of teaching program 112 is performed with teaching program generation and change function 113 based on the change of the welding condition performed by using welding condition change function 110.

In addition, with respect to teaching program 112 stored in teaching program storage function 111, in a case where the same welding condition 105 is applied to different welding lines 103, the same welding condition identification number is also assigned to welding line 103 to which different welding line identification information is assigned in teaching program 112, and a welding line identification number is also assigned to welding line 103 stored in welding line storage function 102. For example, it is possible to set a welding condition of the welding condition identification information "5" to the welding line to which welding line identification information "4" is assigned. In this manner, it is possible to apply the same welding condition 105 configuring welding line 103 stored in welding line storage function 102 to different welding lines 103 in teaching program 112, and it is possible to realize labor saving of creation and change of teaching program 112.

For example, as described in FIG. 3, by classifying the welding parameters such as the welding current configuring welding condition 105 to the "start and intermediate" and the "end", the teaching point other than the welding start point and the welding end point is recognized as the "intermediate" also with respect to the welding line of which the number of coordinate positions is different such as the welding line having five coordinate positions and the welding line having nine coordinate positions. Therefore, it is possible to correspond to both welding lines under one welding condition. For different welding lines 103, since information of the torch target position and the torch orientation is handled as relative data with respect to welding line 103, it is possible to apply the same welding condition even if, for example, the coordinate positions of welding line 103 are different.

Further, welding line 103 displayed on display unit 301 will be described in detail by using FIG. 4 to FIG. 9. FIG. 4 illustrates an example showing a plurality of coordinate positions 104 of welding line 103. In FIG. 4, No. 1 to No. 5 represent numbers of coordinate position 104 of the welding path relating to the welding object, and X, Y, and Z represent specific coordinates of coordinate position 104, respectively. In addition, in FIG. 4, an example where welding condition 105 in which the welding condition identification information is "5" is selected is shown.

FIG. 5 to FIG. 9 illustrate examples showing welding conditions 105 having a welding parameters. FIG. 5 to FIG. 9 show specific contents of welding conditions 105 where the welding condition identification information shown in FIG. 4 is "5".

In FIG. 5 to FIG. 9, the "start and intermediate" represent the welding parameters relating to the welding start point, and the intermediate point between the welding start point and the welding end point, and the "current" represents the welding current, the "voltage" represents the welding voltage, and the "speed" represents a welding speed. In this example, a case where the welding current, the welding voltage, and the welding speed are the same at the welding start point and the intermediate point is shown.

In addition, in FIG. 5 to FIG. 9, the "end" represents the welding parameters relating to the welding end point, the "current" represents the welding current, the "voltage" represents the welding voltage, and a "time" represents a crater process time.

In addition, in FIG. 5 to FIG. 9, the "target position and orientation" represent the torch target position and the torch orientation. dx, dy, and dz represent the torch target position. Orientation U, orientation V, and orientation W represent the torch orientation. Those positions and orientations are common with respect to the entirety of welding start point S, intermediate points M1 to M3, and welding end point E.

In this manner, as described in FIG. 5 to FIG. 9, control function 107 causes the torch target position, the torch orientation, and the welding parameters on display unit 301 to be collectively displayed so that the operator can easily see the torch target position, the torch orientation, and the welding parameters.

As described above, by changing a parameter that is required for changing a welding condition from the welding condition shown in FIG. 5 to the welding condition shown in FIG. 9 by the operator, it is possible to change the welding conditions of the welding condition identification information "5". At this time, the operator selects one welding line among a plurality of welding lines displayed on display unit 301 as the three-dimensional model different from the information of FIG. 3 by using input unit 401 shown in FIG. 2. Control function 107 causes display function 106 to display coordinate position 104 and welding condition 105 of the selected welding line on display unit 301. FIG. 4 illustrates a display state of display unit 301. The operator changes the torch orientation by using input unit 401, while watching display unit 301. The following operation is as described above, and as a result, as described in FIG. 9, it is possible to change the welding conditions of the welding condition identification information "5".

In this manner, by grouping the welding conditions with the welding condition identification number, it is possible to prevent forgetting to change the torch target position and the welding parameters of another coordinate position to be similarly changed when the torch orientation is changed. With this, it is possible to prevent welding defects from being caused.

INDUSTRIAL APPLICABILITY

In the offline teaching device of the present disclosure, the operator does not need to change the welding conditions of the plurality of coordinate positions in the teaching program one by one for each coordinate position, and changes the welding condition stored in the welding line storage function, and thereby can change the welding conditions at the plurality of coordinate positions in the teaching program at once. With this, it is possible to reduce the burden on a changing work of the operator, to prevent forgetting to change the welding conditions, and to prevent welding defects. From the above effects, the present disclosure is industrially useful as the offline teaching device that performs creation, edit, or the like the teaching program for operating a robot.

REFERENCE MARKS IN THE DRAWINGS 101 offline teaching device
102 welding line storage function
103 welding line
104 coordinate position
105 welding condition
106 display function
107 control function
108 operation function
109 selection function
110 welding condition change function
111 teaching program storage function
112 teaching program
113 teaching program generation and change function
201 control unit
202 welding line storage unit
203 teaching program storage unit
301 display unit
401 input unit

The invention claimed is:

1. A welding system comprising:
a memory; and
a processor configured to:
store in the memory a plurality of welding line entries, each welding line entry including: (i) a welding line identification; (ii) a plurality of coordinate positions in a welding path; and (iii) a welding condition, the welding condition including a welding condition identification and plural values relating to welding for each of the coordinate positions;
select, in response to associated user input, one welding line entry, among the plurality of welding lines entries;
make a change, in response to associated user input, to at least one of the plural values in the welding condition included in the selected welding line entry;
automatically apply in the memory, in response to associated user input, the change made in the selected welding line entry to each of the plurality of welding line entries that include the same welding condition identification as the selected welding line entry; and
control welding according to one or more of the welding line entries stored in the memory.

2. The welding system of claim 1, wherein the plural values of the welding condition comprise a torch target position, a torch orientation, and a welding parameter.

3. The welding system of claim 1, wherein the plural values of the welding condition include separate: (i) values to be applied to first and intermediate coordinate positions of the plurality of coordinate positions in the welding path; and (ii) values to be applied to a last coordinate position of the plurality of coordinate positions in the welding path.

* * * * *